United States Patent [19]

Kishi et al.

[11] Patent Number: 5,413,847
[45] Date of Patent: May 9, 1995

[54] PREPREG AND COMPOSITE

[75] Inventors: Hajime Kishi; Atsushi Ozaki; Nobuyuki Odagiri, all of Iyo, Japan

[73] Assignee: Toray Industries, Inc., Nihonbashimuromachi, Japan

[21] Appl. No.: 38,102

[22] Filed: Mar. 30, 1993

[30] Foreign Application Priority Data

Mar. 30, 1992 [JP] Japan ................... 4-106125

[51] Int. Cl.⁶ .............................. B32B 5/16
[52] U.S. Cl. ................... 428/283; 428/367; 428/408; 428/902
[58] Field of Search ........... 428/283, 284, 408, 367, 428/902

[56] References Cited

U.S. PATENT DOCUMENTS

| | | | |
|---|---|---|---|
| 4,874,661 | 10/1989 | Browne et al. | 428/246 |
| 4,992,325 | 2/1991 | Kim et al. | 428/241 |
| 5,028,478 | 7/1991 | Odagiri et al. | 428/283 |

FOREIGN PATENT DOCUMENTS

| | | |
|---|---|---|
| 0382575 | 8/1990 | European Pat. Off. |
| 0399220 | 11/1990 | European Pat. Off. |
| 2256144A | 1/1993 | United Kingdom |

OTHER PUBLICATIONS

European Search Report, EP 93 30 2473 (Aug. 3, 1993).
Abstract from Database WPI/Derwent, JP-A-4 096 962 (Mar. 30, 1992).
Abstract from Database WPI/Derwent, JP-A-1 026651 (Jan. 1989).

*Primary Examiner*—James J. Bell
*Attorney, Agent, or Firm*—Fish & Richardson

[57] ABSTRACT

A prepreg and a composite prepared from the prepreg having high impact resistance, high interlayer toughness and high tensile strength are disclosed. The prepreg comprises the following elements [A], [B] and [C]:

[A]: reinforcing fibers;
[B]: a resin composition including a thermosetting resin and a thermoplastic resin which is soluble in said thermosetting resin, which resin composition being capable of forming a micro-phase separation structure; and
[C]: fine particles which are insoluble in said element [B] and which do not contain an elastomer component;

said element [C] being localized in a surface of said prepreg. The present invention also provides a composite prepared from this prepreg.

26 Claims, 2 Drawing Sheets

PREPREG AND COMPOSITE

BACKGROUND OF THE INVENTION

I. Field of the Invention

This invention relates to a prepreg and a composite. More particularly, this invention relates to a prepreg and a composite which are used for structures for which high strength and high elastic modulus, as well as high specific strength and high specific elastic modulus calculated by dividing the strength and elastic modulus with specific gravity, respectively, are demanded.

II. Description of the Related Art

Since advanced composites comprising reinforcing fibers and a matrix resin as indispensable constituents have heterogeneous structures, the physical properties in the direction of the fibers are largely different from those in the other directions. For example, the resistance to drop impact is governed by peeling strength between layers, so that it is not so improved even if the strength of the reinforcing fibers is increased. Composites having a matrix resin consisting essentially of a thermosetting resin have insufficient resistance to drop impact due to the poor toughness of the matrix resin. Thus, a number of methods have been proposed for improving the physical properties in the directions other than the reinforcing fibers, especially impact resistance.

Methods for increasing the toughness of the thermosetting resin per se include a method in which a polysulfone resin is added to an epoxy resin (Japanese Laid-open Patent Application (Kokai) No. 60-243113); and a method in which an aromatic oligomer is added to an epoxy resin (Japanese Laid-open Patent Application (Kokai) No. 61-228016). The impact resistance of the composite is allegedly improved by the increase in the toughness of the thermosetting resin.

Japanese Laid-open Patent Application (Kokai) No. 60-63229 discloses a method for increasing the impact resistance by providing an epoxy resin film modified with an elastomer between layers of fiber-reinforced prepregs.

U.S. Pat. No. 4,604,319 discloses that the impact resistance is improved by providing a thermoplastic resin films between layers of fiber-reinforced prepregs.

The present inventors disclosed in U.S. Pat. No. 5,028,478 a matrix resin containing particles made of a resin. Particularly, the present inventors disclosed that a composite having improved impact resistance while keeping the good tackiness and drapability of the prepreg can be obtained by localizing the resin particles in the surface of the prepreg.

U.S. Pat. No. 4,863,787 discloses that a composite having an improved impact resistance can be obtained by using a prepreg employing a matrix resin comprising an epoxy resin, reactive oligomer and elastomer particles having particle sizes of 10–75 $\mu$m. It is described that a micro-phase separation is formed in the cured resin portion other than the elastomer particles.

EP-A2-0,377,194 discloses that a composite having an improved impact resistance can be obtained by using an epoxy resin containing polyimide particles soluble in epoxy resin with particle sizes of 2–35 $\mu$m partially having a non-aromatic skeleton, such as aminophenyltrimethyl indane or the like. It is described that the soluble polyimide particles are dissolved in the interlayer zones of the composite during the curing.

Japanese Laid-open Patent Application (Kokai) No. 3-26750 discloses that a composite with excellent impact resistance can be obtained by employing a matrix resin comprising an epoxy resin, reactive polysulfone oligomer and a reactive elastomer, which contains resin particles comprising a reactive elastomer and an epoxy resin.

However, with these known methods, the increase in the impact resistance is insufficient, or the impact resistance is improved at the sacrifice of other properties such as thermal resistance and ease of handling.

More particularly, if the toughness of the resin is increased by incorporating a macromolecular thermoplastic resin such as polysulfone as disclosed in Japanese Laid-open Patent Application (Kokai) No. 60-243113, the viscosity of the resin composition is so high that it is difficult to impregnate the resin composition into the reinforcing fibers, and the tackiness and drapability of the prepreg are also deteriorated. In cases where an oligomer having lower molecular weight is added as disclosed in Japanese Laid-open Patent Application (Kokai) No. 61-228016, it is necessary to add the thermoplastic resin in a sufficient amount in order to attain a sufficient toughness of the resin. As a result, the viscosity of the resin composition is so high that it is difficult to impregnate the resin composition into the reinforcing fibers. Further, the more the amount of the thermoplastic resin, the poorer the solvent resistance of the cured material. Still further, even if the toughness of the resin per se is increased, the increase in the impact resistance of the composite is saturated. The maximum compressive strength after impact (compressive strength after impact is hereinafter referred to as "CAI") of a quasi-isotropic plate was given attained in the examples is only 46.1 ksi.

In cases where an independent film containing a thermosetting resin modified with an elastomer is used as disclosed in Japanese Laid-open Patent Application (Kokai) No. 60-63229, the more the content of the elastomer, the lower the thermal resistance. On the other hand, if the content of the elastomer is small, the increase in the impact resistance is very small. The maximum CAI indicating the impact resistance attained in the examples is only 48.3 ksi.

In cases where a thermoplastic resin film is used as disclosed in U.S. Pat. No. 4,604,319, although both of the thermal resistance and impact resistance are improved to some degree by employing a thermoplastic resin film having good thermal resistance, the tackiness and drapability which are advantageous features of thermosetting resins are impaired. Further, the solvent resistance of the composite is deteriorated due to the poor solvent resistance of the thermoplastic resin film, which is a common drawback of thermoplastic resins. The maximum CAI attained in the examples is only 51 ksi.

If the particles existing in the interlayer zones are made of an elastomer as disclosed in U.S. Pat. No. 4,863,787, the thickness of the interlayer zones is easily changed due to the changes in the curing conditions such as pressure and heating rate, so that the impact resistance is likely influenced by the curing conditions. Further, the existence of the elastomer decreases the thermal resistance of the composite. The maximum CAI attained in the examples is only 54.4 ksi.

In cases where a soluble polyimide is arranged in the interlayer zones as disclosed in EP-A2-0,377,194, the thickness of the interlayer zones is also fluctuated due to the fluctuation in the curing conditions, so that the impact resistance is influenced by the curing conditions. The maximum CAI attained in the examples is only 49.9 ksi.

Since Japanese Laid-open Patent Application (Kokai) No. 3-26750 does not describe the CAI in the examples, the impact resistances cannot be compared. It is thought that the elastomer in the particles reduce the thermal resistance.

On the other hand, U.S. Pat. No. 5,028,478 disclosed by the present inventors may be the closest prior art in the respect that a composite in which resin particles are localized in the interlayer zones is disclosed.

However, the composite disclosed in this U.S. patent is still imperfect because the toughness of the resin per se is insufficient. In the systems in which the impact resistance is promoted while keeping the thermal resistance, the maximum CAI attained in the examples is 53.3 ksi. Although the CAI may be increased to about 60 ksi within the scope of this U.S. patent by employing particles made of a thermoplastic resin having somewhat lower thermal resistance, the thermal resistance of the composite may be reduced in this case.

SUMMARY OF THE INVENTION

Accordingly, an object of the present invention is to provide a prepreg that gives a composite which has higher impact resistance and higher interlayer toughness than those of the known prepregs described above, the high impact resistance being stably attained irrespective of the curing conditions, which further has a high tensile strength. It is also an object of the present invention to provide a composite obtained from such a prepreg.

To attain these objects, the present invention provides a prepreg comprising the following elements [A], [B]and [C]:

[A]: reinforcing fibers;
[B]: a resin composition including a thermosetting resin and a thermoplastic resin which is soluble in said thermosetting resin, which resin composition being capable of forming a micro-phase separation structure; and
[C]: fine particles which are insoluble in said element [B] and which do not contain an elastomer component;

said element [C] being localized in a surface of said prepreg.

The present invention also provides a composite comprising at least two layers, at least one layer comprising the following elements [A], [B'] and [C]:

[A]: reinforcing fibers;
[B']: cured resin having a micro-phase separation structure, which has a phase containing a thermosetting resin as the major constituent and a phase containing a thermoplastic resin as the major constituent; and
[C]: fine particles which are insoluble in said element [B'] when element [B'] is before cured, and which do not contain an elastomer component;

said element [C] being localized in interlayer zones between said layers.

The composite prepared from the prepreg of the present invention has high thermal resistance, excellent impact resistance and interlayer toughness (toughness of the interlayer zones), while the prepreg retains good tackiness and the drapability. Therefore, the damage given by impact is small and the residual compressive strength is high. Further, excellent composite having the high impact resistance is stably obtained irrespective of the fluctuation of the fabrication conditions such as heating rate, curing temperature and pressure. In the fiber-reinforced composite according to the present invention, the generation of cracks when the composite is drawn in the direction perpendicular to the direction of axes of the reinforcing fibers and when the composite is exposed to a cycle of heating/cooling is largely reduced. The composite has excellent fatigue resistance. The peeling of the edge portions of cross-ply laminate (composite prepared by laying-up prepregs such that the directions of reinforcing fibers in different prepregs are at right angles) is reduced, and the tensile strength in the direction of the fibers is extremely high.

DETAILED DESCRIPTION OF THE PREFERRED EMBODIMENTS

Figure 1:
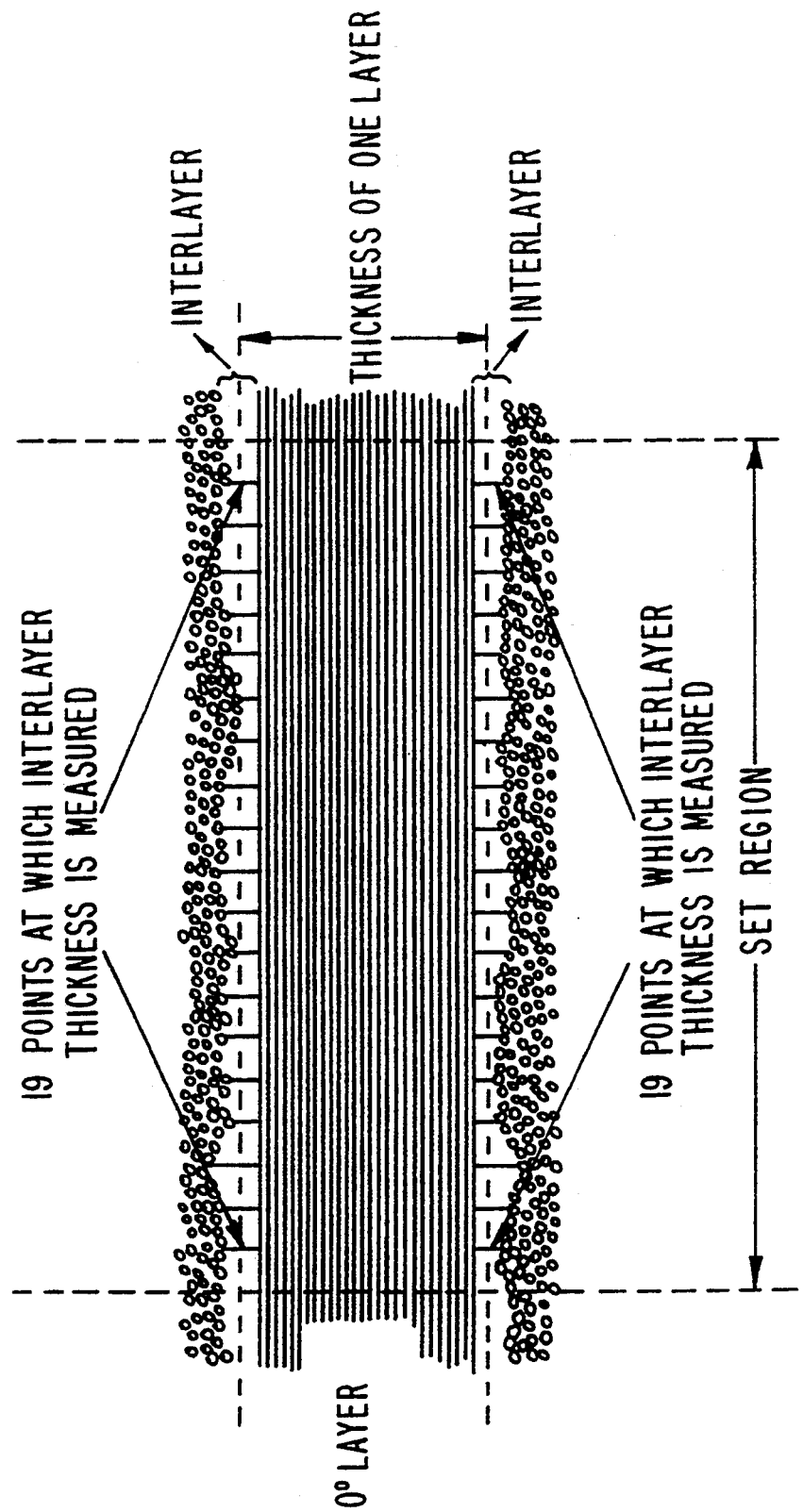
FIG. 1 is a schematic cross-sectional view for explaining the method for measuring the average thickness and distribution of the thickness of the interlayer zones.

The element [A] in the present invention is reinforcing fibers.

The reinforcing fibers are those having good thermal resistance and tensile strength, which are generally used as materials of advanced composite. Examples of the fibers include carbon fibers, graphite fibers, aramide fibers, silicon carbide fibers, alumina fibers, boron fibers, tungsten carbide fibers and glass fibers. Among these, carbon fibers and graphite fibers are especially preferred since they have high specific strength and high specific elastic modulus, and they largely contribute to the light weight of the prepreg. Although any carbon fibers and graphite fibers may be used depending on the use, carbon fibers having a tensile strength of not less than 450 kgf/mm$^2$ and a tensile elongation of not less than 1.7% are best suited. The length of the reinforcing fibers may preferably be not shorter than 5 cm in order that the strength of the reinforcing fibers is well exhibited in the composite. The carbon fibers and graphite fibers may contain other reinforcing fibers. The shape and arrangement of the reinforcing fibers are not restricted. For example, the fibers may be arranged in one direction, in random directions, in the form of a sheet, mat, woven fabric or braid. For uses for which high specific strength and high specific elastic modulus are demanded, although the arrangement of the reinforcing fibers in which the fibers are aligned in one direction is best preferred, reinforcing fibers in the form of cloth (woven fabric) are also preferred since the ease of handling is good.

The element [B] and element [B'] comprise two components, that is, a thermosetting resin and a thermoplastic resin which is soluble in the thermosetting resin. If the element [B] or [B'] contains the thermosetting resin alone, the obtained composite is brittle, and if it contains the thermoplastic resin alone, moldability, resistance to environment and durability are poor.

It should be noted that the thermosetting resin may be a mixture of a plurality of thermosetting resins and a plurality of thermoplastic resins.

As the thermosetting resin, those which are cured by external energy such as heat, light or electron beam to partially form three-dimensional cured material are preferred.

A preferred example of the thermosetting resin is epoxy resins. Epoxy resins are used in combination with a curing agent and/or a curing catalyst. The epoxy resins of which precursors are amines, phenols or compounds having carbon-carbon double bond are especially preferred. Examples of the epoxy resins derived from amines include tetraglycidyldiaminodiphenyl methane, triglycidyl-p-aminophenol, triglycidyl-m-aminophenol and various isomers of triglycidylaminocresol. Examples of the epoxy resins derived from phenols include bisphenol A type epoxy resins, bisphenol F type epoxy resins, bisphenol S type epoxy resins, phenol novolak type epoxy resins and cresol novolak epoxy resins. Examples of the epoxy resins derived from compounds having carbon-carbon double bond include alicyclic epoxy resins. It should be noted that the epoxy resins are not restricted to the examples mentioned above. Brominated epoxy resins obtained by brominating the above-described epoxy resins may also preferably be employed. The epoxy resins derived from aromatic amines such as tetraglycidyldiaminodiphenyl methane are best preferred since the thermal resistance is high and the adhesiveness between the reinforcing fibers and the resin is high.

The epoxy resins may preferably be used together with epoxy curing agents. Any compound which has an active group that can react with epoxy group may be used as the epoxy curing agent. The compounds having amino group, acid anhydride group or azide group are preferred. More particularly, dicyandiamide, various isomers of diaminodiphenylsulfone, and aminobenzoic acid esters are preferred. Dicyandiamide is preferred since the storing property of the prepreg is good. Various isomers of diaminodiphenylsulfone are best preferred since they give cured material having high thermal resistances. Preferred examples of aminobenzoic acid esters include trimethylene glycol di-p-aminobenzoate and neopentyl glycol di-p-aminobenzoate. Although their thermal resistances are inferior to that of diaminodiphenylsulfone, their tensile elongations are higher than that of diaminodiphenylsulfone, so that they may be selected depending on the intended use.

The epoxy resin may contain a small amount of inorganic fine particles such as colloidal silica, and/or an elastomer as long as the advantageous effects of the present invention are not impaired.

Maleimide resins, resins having acetylene terminals, resins having nadic acid terminals, resins having cyanic acid ester terminals, resins having vinyl terminals, resins having allyl terminals may also preferably be employed. These resins may be employed in combination with epoxy resins or other resins. These resins may be diluted with a reactive diluent, and may contain a modifier such as thermoplastic resin and/or an elastomer in the range that the thermal resistance is not so decreased.

Maleimide resins are compounds having not less than two maleimide groups per one molecule on average. Bismaleimides prepared from diaminodiphenyl methane are preferred. Examples of the maleimide compounds of this kind include N,N'-phenylene bismaleimide, N,N'-hexamethylene bismaleimide, N,N'-methylene-di-p-phenylene bismaleimide, N,N'-oxy-di-p-phenylene bismaleimide, N,N'-4,4'-benzophenone bismaleimide, N,N'-diphenylsulfone bismaleimide, N,N'-(3,3'-dimethyl)-methylene-di-p-phenylene bismaleimide, N,N'-4,4'-dicyclohexylmethane bismaleimide, N,N'-m(or p)-xylylene bismaleimide, N,N'-(3,3'-diethyl)-methylene-di-p-phenylene bismaleimide, N,N'-m-tolylene-di-maleimide and bismaleimide of bis(aminophenoxy)benzene, as well as reaction products between maleic anhydride and mixed polyamine which is a reaction product of aniline and formalin. Mixtures of two or more of these bismaleimides may also be employed. Further, the bismaleimide may contain one or more monomaleimide compounds such as N-allyl maleimide, N-propyl maleimide, N-hexyl maleimide and N-phenyl maleimide.

The maleimide resin may preferably be employed in combination with curing agents (reactive diluents). Any compound having an active group which can react with maleimide group can be employed as the curing agent. The compounds having amino group, alkenyl group such as allyl group, benzocyclobutene group, allylnadicimide group, isocyanate group or epoxy group are preferred. A representative example of the curing agents having amino group is diaminodiphenyl methane and a representative examples of the curing agents having alkenyl group is O,O'-diallylbisphenol A and bis(-propenylphenoxy)sulfone.

Bismaleimide triazine resins (hereinafter referred to as "BT resins") constituted by the above-described bismaleimide and a cyanic acid ester may also preferably be employed as the thermosetting resin in the present invention. As the resins having cyanic acid ester terminals, cyanic acid ester compounds of polyphenols such as bisphenol A are preferred. The resins comprising a cyanic acid ester resin and a bismaleimide resin is commercially available from MITSUBISHI GAS CHEMICAL COMPANY, INC., Tokyo, Japan under the trade name of BT RESIN. These resins may also preferably be employed in the present invention. Although these resins have better thermal resistance and water resistance than epoxy resins, since their toughnesses and impact resistances are poorer than those of epoxy resins, these may be selected depending on the intended use. The ratio of bismaleimide to cyanic acid ester may preferably be 0/100–70/30. In the case of 0/100, although the resin is a triazine resin, this can also preferably be employed in the present invention.

As the thermosetting resin in the element [B] or [B'], thermosetting polyimide resins having reactive terminal groups may also preferably be employed. Preferred examples of the reactive terminal groups include nadiimide group, acetylene group, benzocyclobutene group and the like.

As the thermosetting resin in the element [B] or [B'], known thermosetting resins such as phenol resins, resorcinol resins, unsaturated polyester resins, diallylphthalate resins, urea resins, melamine resins and the like may also be employed.

As mentioned above, the element [B] or [B'] contains a thermoplastic resin component. The thermoplastic resin is soluble in the thermosetting resin. Unless the thermoplastic resin is soluble in the thermosetting resin, the micro-phase separation structure described below cannot be attained. More particularly, the thermoplastic resin must be soluble in the thermosetting resin so that the phase separation of the type so called spinodal decomposition is attained, which is induced when the thermosetting resin is cured after a homogeneous state containing the thermosetting resin and the thermoplastic resin is once formed.

As the thermoplastic resin contained in the element [B] or [B'], aromatic plastics, so called engineering plastics are preferred in order that the high thermal resistance and high elastic modulus which are intrinsic to the thermosetting resin are not impaired. The thermoplastic resins having high thermal resistances, which are soluble in the thermosetting resin, which have aromatic polyimide skeleton, aromatic polyamide skeleton, aromatic polyether skeleton, aromatic polysulfone skeleton or aromatic polyketone skeleton may preferably be employed.

The polyimides may be prepared by any of the known methods. For example, they may be prepared by reacting a tetracarboxylic dianhydride with a diamino compound.

Preferred examples of the tetracarboxylic dianhydride include aromatic tetracarboxylic dianhydrides such as pyromellitic dianhydride, 3,3',4,4'-benzophenone tetracarboxylic dianhydride, 3,3',4,4'-biphenyltetracarboxylic dianhydride and 3,3',4,4'-diphenylether tetracarboxylic dianhydride, more preferably 3,3',4,4'-biphenyltetracarboxylic dianhydride and 3,3',4,4'-diphenylether tetracarboxylic dianhydride.

Preferred examples of the diamino compounds include aromatic diamino compounds such as diaminodiphenyl methane, m-phenylenediamine, p-phenylenediamine, diaminodiphenyl ether, diaminodiphenyl sulfone, diaminodiphenyl sulfide, diaminodiphenyl ethane, diaminodiphenyl propane, diaminodiphenyl ketone, diaminodiphenyl hexafluoropropane, bis(aminophenoxy)benzene, bis(aminophenoxy)diphenyl sulfone, bis(aminophenoxy)diphenyl propane, bis(aminophenoxy)diphenyl hexafluoropropane, fluorenediamine, dimethyl-substituted diaminodiphenyl methane, tetramethyl-substituted diaminodiphenyl methane, diethyl-substituted diaminodiphenyl methane and dimethyldiethyl-substituted diaminodiphenyl methane, more preferably bis(aminophenoxy)benzene, bis(aminophenoxy)diphenyl sulfone, bis(aminophenoxy)diphenyl propane, bis(aminophenoxy)diphenyl hexafluropropane, fluorenediamine, dimethyl-substituted diaminodiphenyl methane, tetramethyl-substituted diaminodiphenyl methane, diethyl-substituted diaminodipehnyl methane, tetraethyl-substituted diaminodiphenyl methane and dimethyldiethyl-substituted diaminodiphenyl methane.

It is preferred that hexafluoropropane skeleton exist in the molecule of the thermoplastic resin having polyimide skeleton, polyamide skeleton, polyether skeleton, polysulfone skeleton or polyketone skeleton because the solubility in the uncured thermosetting resin is increased so that the preferred micro-phase separation structure is attained after the curing. Further, the hexafluoropropane skeleton drastically decreases the water absorption of the cured resin, so that the resistance to environment of the cured resin is also promoted.

It is also preferred that the thermoplastic resin molecule having the polyimide skeleton, polyamide skeleton, polyether skeleton, polysulfone skeleton or polyketone skeleton have a bulky structure in the molecule because the solubility in the uncured thermosetting resin is increased. A specific example of the bulky structure is represented by the following formula [I]:

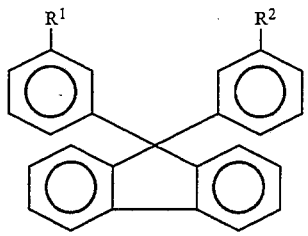

(wherein $R^1$ and $R^2$, the same or different, represent hydrogen atom or $C_mH_{2m+1}$ (wherein m represents an integer of 1 to 3)

The thermoplastic resin in the element [B] or [B'] may preferably be a block copolymer or graft copolymer having chain segments miscible with the thermosetting resin and chain segments immiscible with the thermosetting resin, because the formation of micro-phase separation structure is easily attained.

Preferred examples of such copolymers include block copolymers and graft copolymers having siloxane skeleton which is intrinsically immiscible with the thermosetting resin, which has high toughness and low water absorption. Among these, block copolymers and graft copolymers having polyimide skeleton, polyamide skeleton, polyether skeleton, polysulfone skeleton or polyketone skeleton which are miscible with the thermosetting resin in the element [B] or [B'], as the segments other than the siloxane skeleton are especially preferred.

In cases where the thermoplastic resin in the element [B] or [B'] has a siloxane chain segments, representative examples of the siloxane skeleton is represented by the following formula [II]:

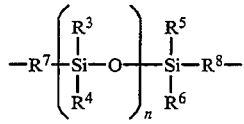

(wherein $R^3$, $R^4$, $R^5$ and $R^6$, the same or different, represent a monovalent organic group, and $R^7$ and $R^8$, the same or different, represent a divalent organic group). Preferred examples of $R^3$, $R^4$, $R^5$ and $R^6$ include $C_1$–$C_{10}$ alkyl group and phenyl group, especially preferably $C_1$–$C_6$ alkyl group. Preferred examples of $R^7$ and $R^8$ include $C_1$–$C_{20}$ alkylene group and phenylene group, especially preferably $C_1$–$C_6$ alkyl group. "n" represents an integer of 1 or more, preferably 3–60.

Dimethylsiloxane and phenylsiloxane, as well as copolymers thereof are especially preferred.

In cases where the thermoplastic resin in the element [B] or [B'] has the segments miscible with the thermosetting resin (hereinafter referred to as "miscible segments" for short) and the segments immiscible with the thermosetting resin (hereinafter referred to as "immiscible segments" for short), the ratio of miscible segments to the immiscible segments is not restricted, but may preferably be 55:45 to 97:3 by weight, more preferably 65:35 to 95:5 by weight.

If a block copolymer or graft copolymer having miscible segments and immiscible segments in one molecule as the thermoplastic resin in the element [B] or [B'], the chain segments which are intrinsically impossible to homogeneously mix in the thermosetting resin, such as silicone resin segments, can be homogeneously mixed with the thermosetting resin by virtue of the miscible segments. By employing such a thermoplastic resin, a matrix resin having high toughness is obtained presumably because the miscible segments assure sufficient adhesiveness with the thermosetting resin after cured, and the immiscible segments exist under such high adhesiveness, so that the micro-phase separation structure having effective form and size for attaining high toughness is formed. In the phase containing the thermoplastic resin as the major component in the cured resin, silicon element originating from the siloxane chain segments exists at a high concentration, which can be identified by using an X-ray microanalyzer. By employing a thermoplastic resin having siloxane chain segments, the water resistance of the cured resin is also drastically promoted.

Since such a thermoplastic resin in the element [B] has the chain segments in one molecule, which are intrinsically immiscible with the thermosetting resin, the increase in the viscosity of the resin composition containing the thermosetting resin and the thermoplastic resin is unexpectedly smaller than in cases where a thermoplastic resin which comprises entirely miscible molecular chain with the thermosetting resin is employed, if the molecular weight is about the same. Therefore, the prepreg having a matrix resin including such a thermoplastic resin has good tackiness and drapability. In other words, the amount of the thermoplastic resin to be added in the element [B] is not so restricted, and a large amount of the thermoplastic resin may be incorporated in the resin composition without impairing the tackiness, which is advantageous to attain high toughness.

When the block copolymer or graft copolymer is employed as the thermoplastic resin in the element [B] or [B'], those having polyimide chain segments are best preferred.

It is preferred that the thermoplastic resin in the element [B] or [B'] have a functional group at its terminal, which can react with the thermosetting resin in the element [B] or [B'], since the adhesiveness at the interfaces between the two phases is promoted, so that solvent resistance and fatigue resistance are improved. Examples of the functional group which can react with the thermosetting resin include amino group, epoxy group, maleimide group, allyl group, carboxyl group, hydroxyl group, cyanate group and isocyanate group.

The content of the thermoplastic resin in the element [B] or [B'] may preferably be 5–40% by weight, more preferably 8–30% by weight with respect to the total components in the element [B] or [B']. If the content of the thermoplastic resin is within this range, toughness-increasing effect is sufficiently obtained while preventing the substantial deterioration of the ease of handling.

The thermoplastic resin in the element [B] may be preliminarily dissolved in the uncured thermosetting resin or may be merely dispersed therein. Alternatively, a part of the thermoplastic resin may be preliminarily dissolved in the uncured thermoplastic resin and the other part of the thermoplastic resin may be merely dispersed in the uncured thermoplastic resin. By changing the ratio of the dissolved part to the dispersed part, the viscosity of the resin composition can be controlled, so that the tackiness and drapability of the prepreg can be desirably controlled. Most of the dispersed thermoplastic resin is also dissolved in the thermosetting resin during the fabrication process and then phase-separated again before completion of the curing, thereby contributing to the formation of the micro-phase separation structure.

In cases where the thermoplastic resin is preliminarily dissolved in the uncured thermosetting resin, the number average molecular weight of the thermoplastic resin in the element [B] or [B'] may preferably be 2000–20,000, more preferably 2500–10,000. If the number average molecular weight is within this range, toughness-increasing effect is sufficiently obtained and the deterioration of the ease of handling due to the increase in the viscosity of the resin composition is not substantial. In cases where the thermoplastic resin in the element [B] is dispersed (not dissolved) in the uncured thermosetting resin, the thermoplastic resin may have a number average molecular weight of 2000 to 200,000 because the tackiness of the prepreg is not adversely affected even if the molecular weight of the thermoplastic resin is large.

The element [B'] in the present invention is a cured resin having the micro-phase separation structure including the phase containing the thermosetting resin as the major component and the phase containing the thermoplastic resin as the major component. The element [B'] is obtained by curing the element [B]. During the process of curing the element [B], the characteristic micro-phase separation structure described in the following is formed. More particularly, the element [B] is a resin composition comprising a thermosetting resin and a thermoplastic resin which is soluble in the thermosetting resin. By curing the element [B], the element [B'] that is a cured resin is formed, in which the phase containing the thermoplastic resin as the major component exists separately from the phase containing the thermosetting resin as the major component so as to attain the micro-phase separation structure. Preferably, at least the phase containing the thermoplastic resin as the major component, more preferably both of the phases, forms three-dimensional continuous phase. The micro-phase separation structure may be one having a continuous phase and the other phase is dispersed in the continuous phase to form a dispersed phase.

By virtue of such a characteristic micro-phase separation structure, the cured resin has a bending elastic modulus of not less than 250 kg/mm$^2$ while keeping a strain energy release rate $G_{IC}$ of not less than 300 J/m$^2$.

The strain energy release rate $G_{IC}$ of the cured resin can be measured by the double tortion method (hereinafter also referred to as "DT method"). The DT method is detailed in Journal of Material Science, Vol. 20, pp. 77–84 (1985). The $G_{IC}$ can be calculated from the load P at which a crack generates, the slope $\Delta C/\Delta a_i$ of compliance C with respect to the length of developed crack and the thickness t of the portion of the sample at which the crack developed, according to the following equation:

$$G_{IC}=P^2(\Delta C/\Delta a_i)/2t$$

The compliance C is defined as $\delta/P$ wherein $\delta$ means the distance of the displacement of the cross head when the crack generated, and P means the load at which a crack generates.

The width of the continuous phase containing the thermoplastic resin as the major component is preferably 0.01–20 μm, more preferably 0.1–10 μm, and so the diameter of the dispersed phase in the continuous phase is preferably 0.01–10 μm, more preferably 0.1–3 μm, because the irregularities in the rupture cross-section is not very small, and the rupture route is not so simplified, so that high toughness is attained.

The element [C] is fine particles which are not soluble in the element [B] and which do not contain elastomer component.

The fact that the element [C] is fine particles is advantageous because the element [C] is dispersed in the matrix resin (element [B]) when the element [C] is mixed with the matrix resin. As a result, the prepreg has good tackiness and drapability given by the matrix resin, so that the ease of handling of the prepreg is good.

Element [C] is insoluble in element [B]. If element [C] is soluble in element [B], it is difficult to form a resin layer having an appropriate thickness in the interlayer zones between each of the laid-up prepregs. Even if a resin layer can be formed in the interlayer zones, the thickness of the interlayer zones varies depending on the fabrication conditions such as temperature and pressure, the reproducibility of the characteristics of the material is low.

The element [C] does not contain an elastomer component. If the element [C] contains an elastomer component, the thermal resistance of the composite material is deteriorated.

It is important to obtain a composite having high impact resistance that the element [C] be localized in the interlayer zones of the composite. The element [C] serves to stably form resin layers with a thickness of 10-70 $\mu$m in the interlayer zones. It is preferred that the average thickness of the interlayer zones containing the element [C] be 10-70 $\mu$m and the distribution in the thickness of the interlayer zones be not more than 50, preferably not more than 40 in terms of CV value in order to attain high reproducibility of the physical properties. Such a structure can be attained by localizing the element [C] with an average particle size of 3-70 $\mu$m and fabricating the composite according to the method described below.

The average and distribution of the thickness of the interlayer zones are determined as shown in FIG. 1. That is, a photomicrograph of a cross-section of a composite prepared by laying-up prepregs in a quasi-isotropic fashion and curing the laid-up prepregs is taken. The magnification is about 200×. Firstly, a 0° layer whose axes of the reinforcing fibers are along the right and left direction of the photomicrograph is selected. A straight line parallel to the axes of the reinforcing fibers of the 0° layer is drawn in the center of the interlayer zone on the 0° layer. Similarly, a straight line parallel to the axes of the reinforcing fibers of the 0° layer is drawn in the center of the interlayer zone under the 0° layer. The distance of the two parallel straight lines is defined as the thickness of one layer. Then a region having a length four times the thickness of one layer is arbitrarily set along the axes of the reinforcing fibers (this region is indicated as "set region" in FIG. 1). The thickness of the interlayer zones on and under the set region is then determined as follows:

That is, 19 straight lines perpendicular to the axes of the reinforcing fibers in the 0° layer are drawn in the interlayer zone on the set region such that the interlayer zone on the set region is equally divided into 20 sections. For each of these 19 lines, the distance between the intersection at which the line crosses the uppermost reinforcing fiber of the 0° layer and the intersection at which the same line crosses the lowermost reinforcing fiber of the another upper layer is measured. This distance is a measured value of the thickness of the interlayer zone. Thus, 19 values are obtained for the upper interlayer zone. Similarly, 19 values are obtained for the lower interlayer zone. From the thus obtained 38 values, average thickness of the interlayer zones $\chi$, standard deviation $\delta_{n-1}$ are calculated. Further, the CV value is calculated according to the following equation:

$$CV(\%) = (\delta_{n-1}/\chi) \times 100$$

The above-described method for measuring the thickness of the interlayer zones can be directly applied to the composites obtained by laying-up prepregs whose strengths are reinforced in one direction. Even in cases where the prepregs constituting the composite are cloth prepregs, the thickness of the interlayer zones can be measured in the same manner. However, in cases where the reinforcing fibers of the cloth prepregs have the structure of plain weaving, since the meshes at the intersections among the warps and woofs are reservoirs of the resin when viewed in the cross-section, these portions are not appropriate for determining the thickness of the interlayer zones. Thus, these portions should not be used as the set region.

The fact that the element [C] of the composite is localized in the interlayer zones mean that most of the element [C] is localized in the vicinity of the surface of the prepreg before being fabricated into the composite. If not less than 90% of the element [C] is localized from the surface to the depth of 15% of the thickness of the prepreg, the impact resistance of the resulting composite is much better than in cases where the element [C] is located in the deep portion of the prepreg, which is outside the scope of this condition. The localization of the element [C] can be attained by known methods such as those described in Japanese Laid-open Patent Application No. (Kokai) 1-26651, as described in more detail below.

As stated in the item of "Description of the Related Art", the present inventors disclosed in U.S. Pat. No. 5,028,478 a matrix resin containing particles made of a resin, which are localized in the interlayer zones of the composite. However, the composite disclosed in this U.S. patent is still imperfect because the toughness of the resin per se is insufficient. In the systems in which the impact resistance is promoted while keeping the thermal resistance, the maximum CAI attained in the examples is 53.3 ksi. Although the CAI may be increased to about 60 ksi within the scope of this U.S. patent by employing particles made of a thermoplastic resin having somewhat lower thermal resistance, the thermal resistance of the composite may be reduced in this case. Further, the toughness in the peeling mode is not always high reflecting the fact that the toughness of the resin per se is insufficient.

On the other hand, a number of trials have been made for increasing the toughness of the matrix resin per se. However, as mentioned above, if the toughness of the resin is increased by incorporating a macromolecular thermoplastic resin such as polysulfone as disclosed in Japanese Laid-open Patent Application (Kokai) No. 60-243113, the viscosity of the resin composition is so high that it is difficult to impregnate the resin composition into the reinforcing fibers, and the tackiness and drapability of the prepreg are also deteriorated. In cases where an oligomer having lower molecular weight is added as disclosed in Japanese Laid-open Patent Application (Kokai) No. 61-228016, it is necessary to add the thermoplastic resin in a sufficient amount in order to attain a sufficient toughness of the resin. As a result, the viscosity of the resin composition is so high that it is difficult to impregnate the resin composition into the reinforcing fibers. Further, the more the amount of the thermoplastic resin, the poorer the solvent resistance of the cured material. The maximum compressive strength of a quasi-isotropic plate after impact was given attained in the examples is only 46.1 ksi.

Still further, even if the toughness of the resin per se is increased, the increase in the impact resistance of the composite is saturated.

In contrast, in the composite according to the present invention, element [B] that is the matrix resin with a high toughness having the characteristic micro-phase separation structure is attained by blending the specific thermoplastic resin in the matrix resin, and element [C] which is fine particles insoluble in element [B] and which does not contain an elastomer component is localized in the interlayer zones, so that interlayer resin portions having high toughness is stably formed, thereby exhibiting excellent impact resistance. In the best mode wherein fine particles made of a thermoplastic resin with a high toughness are employed as element [C], an impact resistance of 58 ksi in terms of CAI, which is surprisingly high can be attained. Further, the toughness of the interlayer zones in the peeling mode is also largely promoted.

Further, it was found that the peeling of the layers at the interlayer zones, which is likely to occur when a cross-ply laminate prepared by laying-up the prepregs at right angles, is largely reduced.

Further, unexpectedly, the excellent impact resistance and interlayer toughness are stably attained irrespective of the fabrication conditions. Further, the generation of cracks when the composite is drawn in the direction perpendicular to the axes of the reinforcing fibers and when a cycle of heating/cooling is repeated, is also largely reduced, reflecting the high toughness of element [B'].

Carbon fiber-reinforced composites employing the matrix resin according to the present invention have extremely high tensile strength. In general, although the tensile strength of the fiber-reinforced composite in the direction of the reinforcing fibers is largely owed to the tensile strength of the reinforcing fibers per se, the tensile strength of the composite is smaller than the value estimated from the tensile strength of the reinforcing fibers. However, it was found that by using the matrix resin according to the present invention, the strength of the fibers is well exhibited and the strength of the composite is promoted when compared with the composites employing the conventional matrix resin.

It is preferred that the elastic modulus and the yield strength of the material constituting element [C] be smaller than the elastic modulus and the yield strength of the cured resin of element [B'], because the impact resistance of the composite is further promoted. On the other hand, if the elastic modulus of element [C] is as low as elastomers, the particles are easily deformed by the fluctuation of the conditions in the fabrication of the composite such as pressure, temperature and heating rate, so that the thickness of the interlayer zones are varied and the composite is likely deformed. As a result, the reproducibility of the physical properties of the composite is low. Thus, although the preferred range of the elastic modulus of the material of the fine particles (element [C]) varies depending on the types of elements [A] and [B] and on the mode of laying-up the prepregs, it is usually preferred to be 80–400 kg/mm$^2$ because high toughness is stably attained irrespective of the fabrication conditions.

The shape of the fine particles (element [C]) may be not only spherical but also other shapes. That is, the fine particles obtained by pulverizing resin granules, by spray-drying or by reprecipitation may also be employed. Still further, milled fibers prepared by cutting fibers into short pieces, as well as those in the form of needles and whiskers may also be employed.

The size of the particles is expressed in terms of particle size. The particle size herein means volume average particle size determined by the centrifugal sedimentation rate method or the like. The particle size of element [C] is not restricted if it is not so large as to largely disturb the arrangement of the reinforcing fibers. In order that the arrangement of the reinforcing fibers is not disturbed and that the thickness of the interlayer zones of the composite is not so large as to deteriorate the physical properties of the composite, the average particle size of element [C] is preferably not more than 100 μm. In view of obtaining the more preferable thickness of the interlayer zones, the average particle size of element [C] is preferably 3–70 μm.

The amount of element [C] is preferably 1–50% by weight with respect to the total amount of the resin in element [B] and [C], because high toughness is brought about by the incorporation of element [C], mixing with the base resin is easy and good tackiness and drapability of the prepreg are attained.

In cases where it is desired to promote the toughness of the interlayer zones of the composite with fine particles (element [C]) having high elongation at break and high toughness while utilizing the rigidity of element [B] for the exhibition of high compressive strength, the amount of element [C] is preferably 2–20% by weight.

The material of element [C] may be any material including thermoplastic resins, thermosetting resins and inorganic materials, as long as it is insoluble in element [B] and it does not contain an elastomer component. Especially preferred are particles of thermoplastic resins. Among these, especially preferred thermoplastic resins include those having a bond selected from the group consisting of carbon-carbon bond, amide bond, imide bond, ester bond, ether bond, carbonate bond, urethane bond, urea bond, thioether bond, sulfone bond, imidazole bond and carbonyl bond. More particularly, preferred examples of the material for constituting element [C] include vinyl resins such as polyacrylates, polyvinyl acetates and polystyrols; thermoplastic resins belonging to the so called engineering plastics such as polyamides, polyaramides, polyesters, polyacetals, polycarbonates, polyphenylene oxides, polyphenylene sulfides, polyallylates, polybenzimidazoles, polyimides, polyamideimides, polyetherimides, polysulfones, polyethersulfones and polyetherether ketones; hydrocarbon resins such as polyethylenes and polypropylenes; and cellulose derivatives such as cellulose acetate and cellulose butyrate. Among these, polyamides, polycarbonates, polyacetals, polyphenylene oxides, polyphenylene sulfides, polyallylates, polyesters, polyamideimides, polyimides, polyetherimides, polysulfones, polyether sulfones, polyetherether ketones, polyaramides and polybenzimidazoles are especially preferred since they give high impact resistance.

Among these, polyamides, polyamideimides, polyetherimides, polyether sulfones and polysulfones are especially suited for the present invention since they give high toughness and high thermal resistance.

Further, resin fine particles made of a combination of a thermoplastic resin and a thermosetting resin, which have semi-IPN structures or which are capable of forming semi-IPN structure are also preferred since the fine particles per se have high solvent resistance so that high solvent resistance of the entire composite is attained. The term "IPN" is an abbreviation of interpenetrating polymer network, which means a structure in which cross-linked polymers of different types penetrate each other to form a network. The term "semi-IPN" means a structure in which a cross-linked polymer and a linear polymer penetrate each other to form a network.

Methods for attaining the semi-IPN structure includes the following:

(1) A method in which the thermoplastic resin and the thermosetting resin are fused by heating, and uniformly mixed, and then the resultant is cooled to form a block;

(2) A method in which the thermoplastic resin and the thermosetting resin are dissolved in a common solvent and uniformly mixed, and then the solvent is evaporated to obtain a block;

(3) The so called spray drying method in which the thermoplastic resin and the thermosetting resin are dissolved in a common solvent and uniformly mixed, and then the solution is spray-dried;

(4) The so called spray reprecipitation method in which the thermoplastic resin and the thermosetting resin are dissolved in a common solvent and uniformly mixed, and then the resulting solution is sprayed into a solvent which does not dissolve the both resins to precipitate the resin particles; and (5) A method in which the thermoplastic resin and the thermosetting resin are dissolved in a common solvent, a dispersion medium immiscible with the common solvent is slowly added while stirring the resulting solution to disperse the solution in the form of particles in the dispersion medium, and then the solvent is removed to collect the fine particles.

In cases where fine particles having semi-IPN structure containing the thermoplastic resin and the thermosetting resin are employed, fine particles having high solvent resistance and good adhesiveness with the matrix resin can be obtained while keeping the toughness of the fine particles per se, by selecting the resin composition of the particles. It is also acceptable that the semi-IPN structure be formed during the fabrication of the composite. Element [C] having semi-IPN structure is preferred because it gives a composite having excellent impact resistance, solvent resistance and fatigue resistance.

The content of the thermoplastic resin in the fine particles having the semi-IPN structure is preferably 30–99%, more preferably 50–98% by weight because the solvent resistance of the fine particles is good and deterioration of the impact resistance of the composite due to the low toughness of the fine particles is prevented.

With the fine particles having semi-IPN structure, even if the content of the thermosetting resin is as small as about 2% by weight, the solvent resistance-promoting effect is unexpectedly large, and the fatigue resistance is also drastically increased.

Although the toughness of the thermoplastic resin fine particles is expected to be reduced by forming the semi-IPN structure with a thermosetting resin, so that the impact resistance of the resulting composite is smaller than the composite prepared by using fine particles made of the thermoplastic resin alone, it was unexpectedly discovered that the impact resistance of the composite employing the fine particles having the semi-IPN structure is higher if the content of the thermosetting resin is small. This is presumably because the adhesiveness between the fine particles and the matrix resin (element [B]) is increased by the semi-IPN structure.

It is preferred that the fine particles have the semi-IPN structure or capable of forming the semi-IPN structure between a thermoplastic resin and an epoxy resin or maleimide resin, especially between a polyamide and an epoxy resin, because best composite having well-balanced impact resistance, solvent resistance, fatigue resistance, thermal resistance and the like may be obtained.

As the element [C], thermosetting resin fine particles may also be employed. In this case, although the toughness of the fine particles per se is smaller than those made of thermoplastic resins, if the fine particles are employed in combination with the matrix resin (element [B]) which has sufficiently high toughness, the impact resistance of the composite is largely promoted since the toughness of the entire resin-rich portions in the interlayer zones is high. Further, employment of a thermosetting resin brings about an advantageous effect that the thermal resistance is higher than in the case of employing a thermoplastic resin. Preferred examples of the thermoplastic resins employed in element [C] include phenol resins and epoxy resins.

The prepreg in which element [C] is localized in the surface thereof may be prepared by the methods disclosed in Japanese Laid-open Patent Application (Kokai) Nos. 1-26651, 63-170427 and 63-170428. That is, the prepreg may be prepared by a method in which element [C] is attached to the surface of a preliminarily made prepreg comprising the reinforcing fibers and the matrix resin; by a method in which element [C] is uniformly mixed in the matrix resin and element [C] is localized in the surface of the prepreg during the reinforcing fibers are impregnated with the matrix resin by the filtration by the reinforcing fibers; or by a method in which a primary prepreg comprising the reinforcing fibers and the matrix resin is first prepared, and then a film of the matrix resin containing element [C] at a high concentration is attached to the surface of the primary prepreg.

The present invention will now be described by way of examples thereof. It should be noted that the examples are presented for the illustration purpose only and should not be interpreted in any restrictive way.

In the examples below, all parts are by weight unless otherwise specified.

EXAMPLE 1

<Part A: Synthesis of Reactive Polyimide Oligomer>

In a separable flask having 3000 ml of inner volume equipped with a nitrogen inlet, thermometer, stirrer and a dehydration trap, 218 g (0.75 mol) of 1,3-bis(3-aminophenoxy)benzene (hereinafter referred to as "APB"), 33 g (0.094 mol) of 9,9'-bis(4-aminophenyl)fluorene (hereinafter referred to as "FDA"), 122 g (0.094 mol) of amino-terminated dimethyl siloxane with an $NH_2$ equivalent of 650 (BY-16-853 commercially available from TORAY DOW CORNING SILICONE, CO., LTD., Japan) were dissolved in 2000 ml of N-methyl-2-pyrrolidone (hereinafter referred to as "NMP") under stirring under nitrogen atmosphere. To this mixture, 250 g (0.85 mol) of solid biphenyl tetracarboxylic dianhydride was slowly added and the resulting mixture was stirred at room temperature for 3 hours. The mixture was then heated to 120° C. and stirred at this temperature for 2 hours. The mixture was then allowed to cool to room temperature and 50 ml of triethylamine and 50 ml of toluene were added. The resulting mixture was heated to 160° C. to carry out azeotropic dehydration, thereby obtaining about 30 ml of water. After cooling this reaction mixture, the mixture was diluted with twice volume of NMP and the resultant was slowly poured into 20 liters of acetone to precipitate amine-terminated siloxane polyimide oligomer as a solid product.

The precipitate was dried in vacuum at 200° C. The number average molecular weight (Mn) of this oligomer was measured by gel permeation chromatography (hereinafter referred to as "GPC") using dimethylformamide (hereinafter referred to as "DMF") solvent, which was 4900 in terms of polyethylene glycol (hereinafter referred to as "PEG"). The glass transition temperature (Tg) determined by differential scanning calorimeter (hereinafter referred to as "DSC") was 189° C. The introduction of siloxane skeleton and the amine-terminated structure were confirmed by NMR spectrum and IR spectrum.

<Part B: Preparation of Resin of Element [B] and Measurements of Physical Properties Thereof>

In a beaker, 25 parts of the siloxane polyimde oligomer obtained in the above-described Part A, 40 parts of tetraglycidyldiaminodiphenyl methane (ELM434, commercially available from SUMITOMO CHEMICAL, CO., LTD., Osaka, Japan), 30 parts of bisphenol A type epoxy resin (EPIKOTE 825, commercially available from YUKA SHELL EPOXY CO., LTD., Japan) and 30 parts of bisphenol F type epoxy resin (EPICLON 830, commercially available from DAINIPPON INK & CHEMICALS, INC., Tokyo, Japan) were placed. The mixture was heated at 120° C. for 2 hours to dissolve the oligomer in the epoxy resins. Then 42 parts of 4,4'-diaminodiphenylsulfone (SUMICURE S, commercially available from SUMITOMO CHEMICAL CO., LTD., Osaka, Japan) was added and the mixture was stirred at 140° C. for 10 minutes to dissolve the same.

A vacuum pump was connected to the vessel and the mixture was defoamed in vacuum. The mixture was poured into a releasing-treated mold with an inner size of 120 mm×120 mm×3 mm, which was preliminarily heated at 120° C. The mixture was then cured in an oven at 130° C. for 2 hours and then at 180° C. for another 2 hours to obtain a cured resin plate with a thickness of 3 mm.

The Tg of the thus obtained cured resin was 205° C. The above-mentioned sample was cut out from this plate and strain energy release rate $G_{IC}$ and bending elastic modulus were measured, which were 600 J/m$^2$ and 370 kg/mm$^2$ respectively A resin plate sizing 60 mm×10 mm×2 mm was boiled for 20 hours. The water absorption was 3.1%.

A polished surface of the cured resin was stained with osmic acid and its reflected electron image was observed with a scanning electron microscope. A complex micro-phase separation structure in which each of the two phases forms a continuous phase, and a dispersed phase of the other phase exists in the each continuous phase. The same visual field was subjected to elementary analysis with an X-ray microanalyzer. As a result, silicon element was densely distributed in the high contrast phase which is black in a photograph.

<Part C: Preparation of Prepreg and Composite and Measurements of Physical Properties Thereof>

Firstly, a resin was prepared using a kneader as follows. That is, 25 parts of the siloxane polyimide oligomer prepared in Part A described above, 40 parts of tetraglycidyldiaminodiphenyl methane (ELM434, commercially available from SUMITOMO CHEMICAL, CO., LTD.), 30 parts of bisphenol A type epoxy resin (EPIKOTE 825, commercially available from YUKA SHELL EPOXY CO., LTD.) and 30 parts of bisphenol F type epoxy resin (EPICLON 830, commercially available from DAINIPPON INK & CHEMICALS, INC.) were placed in a vessel. The mixture was heated at 120° C. for 2 hours to dissolve the oligomer in the epoxy resins. The mixture was then cooled to 70° C. and 42 parts of 4,4'-diaminodiphenylsulfone (SUMICURE S, commercially available from SUMITOMO CHEMICAL CO., LTD.) was added and the mixture was stirred).

The thus obtained resin composition was coated at a constant thickness on a releasing paper to which a silicone releasing agent had been thinly applied, to obtain resin films having a weight of 32 g/m$^2$. Carbon fibers (TORAYCA T800H, commercially available from TORAY INDUSTRIES, INC., Tokyo, Japan) were aligned in one direction and then sandwiched between two sheets of resin-coated paper prepared as mentioned above. The sheets of paper were pressed to the fibers to impregnate the fibers with the resin to obtain a primary prepreg. The weight of the carbon fibers was 190 g/m$^2$.

Then 68 parts of the resin composition described above was prepared again and then mixed with 32 parts of fine particles of amorphous transparent nylon (GRILAMID TR-55, commercially available from MITSUBISHI KASEI CORPORATION, Tokyo, Japan) with an average particle size of 13 μm in a kneader at 60° C. This mixture was coated on a releasing paper to obtain resin films with a weight of 20 g/m$^2$.

On both surfaces of the above-described primary prepreg, the thus obtained resin films containing the fine particles were laid-up and the laminate was pressed with a roll to obtain a prepreg. This prepreg had good tackiness and drapability.

Figure 2:
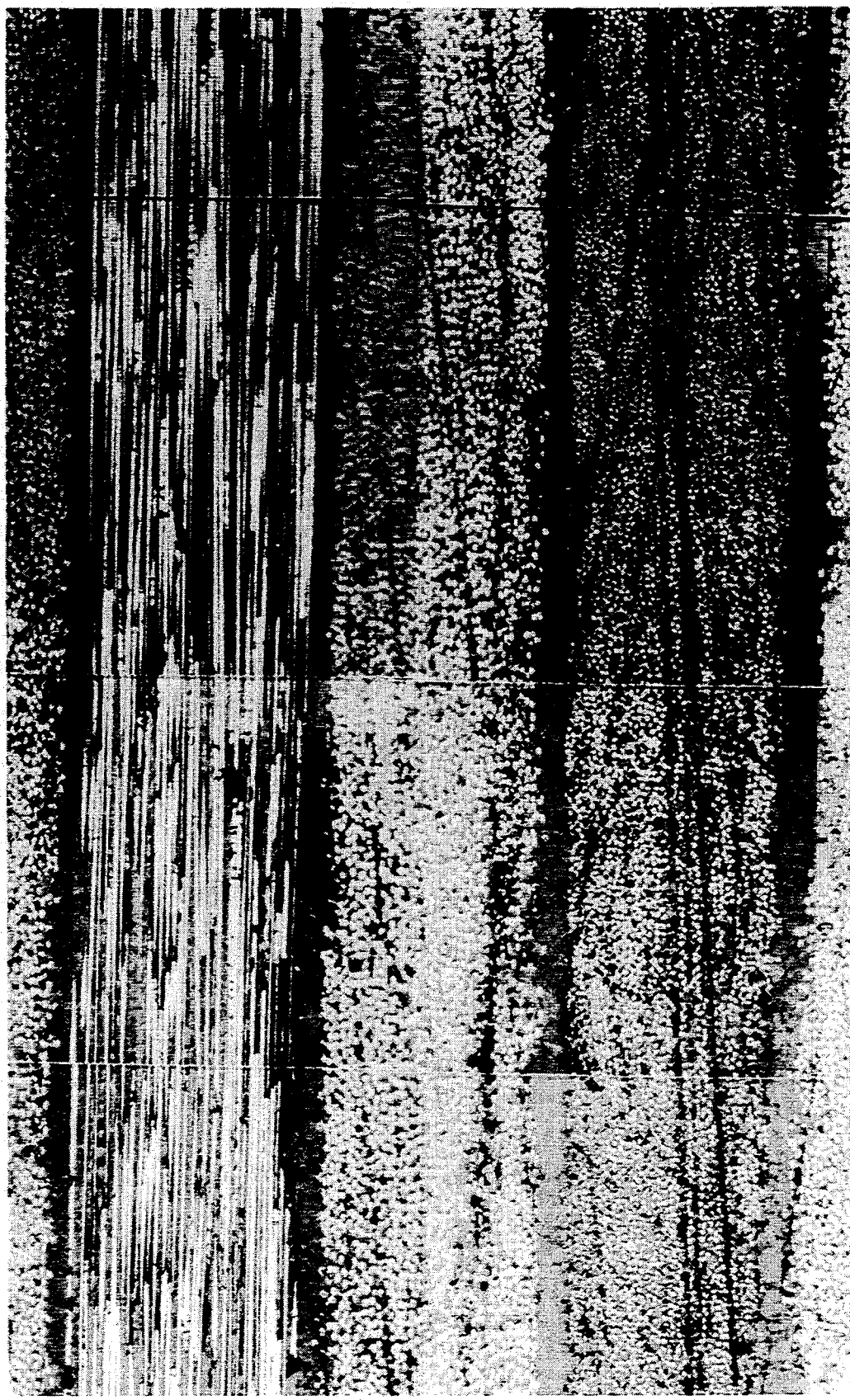
FIG. 2 is a photomicrograph showing the enlarged cross-section of the prepreg obtained in Example 1.

Twenty four prepregs thus obtained were laid-up in a quasi-isotropic fashion (+45°/0°/−45°/90°)3s. According to a conventional vacuum bag autoclave molding method, the laminate was heated to 180° C. at a heating rate of 1.5°C./min. under a pressure of 6 kg/cm$^2$ and then heated at this temperature for 2 hours to obtain a cured plate. The percentage of the fibers was 56 vol % and the percentage of the resin was 35.1 wt %. A cross-section of this cured plate was observed with a microscope. As a result, it was confirmed that the GRILAMID fine particles localized in the interlayer zones of the laminate. A photomicrograph of the cross-section at 200× magnification is shown in FIG. 2. From this photomicrograph, the average thickness of the interlayer zone was calculated, which was 27.9 μm. The CV value showing the distribution of the thickness of the interlayer zone was 27%.

A test sample sizing 4 inches×6 inches was cut out from the cured plate. Using an indenter with a diameter of 5/8 inch, drop impact energy of 1500 in.lb/in was given to the sample. The damaged area measured with an ultrasonic damage-imaging apparatus M400B commercially available from CANON/HORONIX CO., LTD., Japan was 0.35 inch$^2$. The residual compressive strength (CAI) was determined according to ASTM D-695, which was 58 ksi. A polished surface of the cured resin was stained with osmic acid and its reflected electron image was observed with a scanning electron microscope. As a result, a micro-phase separation structure was observed in the resin portion.

The CAI and damaged area in cured plates prepared by curing the same prepreg under different curing conditions (curing temperature and rate of heating) are shown in Table 1. As can be seen from Table 1, excellent impact resistances are stably attained even when the curing conditions are changed.

TABLE 1

Dependence of CAI on Curing Conditions in Composite of Example 1

| Sample No. | Curing Temperature(°C.) | Rate of Heating (°C./min.) | CAI (ksi) | Damaged Area (in$^2$) |
|---|---|---|---|---|
| A | 180 | 0.28 | 55.9 | 0.38 |
| B | 180 | 1.5 | 58.0 | 0.35 |
| C | 180 | 2.8 | 57.0 | 0.36 |
| D | 174 | 1.5 | 60.1 | 0.30 |
| E | 192 | 1.5 | 58.2 | 0.32 |
| F | 207 | 1.5 | 58.2 | 0.35 |

Twenty prepregs were laid-up in one direction and the resulting laminate was cured. The toughness of the interlayer zone in the composite was measured. As a result, the toughness $G_{IC}$ of the peeling mode was 530 J/m$^2$ (double cantilever beam method), and the toughness $G_{IIC}$ of the slipping mode was 3330 J/m$^2$ (end-notched flexure method).

A cured plate having a layered structure of (0)$_2$/(90)$_8$/(0)$_2$ was prepared and a sample sizing 9 inches length×1 inch width was cut out. Tabs were attached to the sample and tensile test was carried out. The number of cracks formed in the 90° layers spanning 5.7 inches was 4 when the strain was 1.3%.

A sample sizing 30 mm×40 mm was cut out from a cured plate having the same layered structure as that used in the above-described CAI test and a thermal cycle test was carried out. That is, the sample was placed in an environment at −196° C. (immersed in liquid nitrogen) for 3 minutes and then placed in an environment at 100° C. for 3 minutes, and this cycle was repeated 30 times. No cracks were formed in this thermal cycle test.

Six prepregs were laid-up in the same direction and cured. The tensile strength of this cured plate in the direction of 0° was 452 ksi. Further, 10 prepregs were laid-up in the structure of (±25/±25/90)s and the laminate was cured. The obtained cured plate was subjected to tensile test and the strength at which the edge of the plate is first peeled off was measured, which was 70.2 ksi.

EXAMPLE 2

<Part A: Synthesis of Reactive Polyimide Oligomer>

In a separable flask having 3000 ml of inner volume equipped with a nitrogen inlet, thermometer, stirrer and a dehydration trap, 140 g (0.34 mol) of 2,2-bis[4-(4-aminophenoxy)phenyl]propane (hereinafter referred to as "BAPP"), 176 g (0.34 mol) of 2,2-bis[4-(4-aminophenoxy)phenyl]hexafluoropropane (hereinafter referred to as HFBAPP (commercially available from WAKAYAMA SEIKA KOGYO CO., LTD., Japan) were dissolved in 1200 ml of NMP under nitrogen atmosphere. To this mixture, biphenyltetracarboxylic dianhydride (hereinafter referred to as "S-BPDA") (commercially available from MITSUBISHI KASEI CORPORATION) was slowly added and the mixture was stirred at room temperature for 3 hours. The mixture was then heated to 120° C. and stirred at this temperature for 1 hour. The mixture was then allowed to cool to room temperature and 50 ml of triethylamine and 50 ml of toluene were added. The resulting mixture was heated to 160° C. to carry out azeotropic dehydration, thereby obtaining about 22 ml of water. After cooling this reaction mixture, the mixture was diluted with twice volume of NMP and the resultant was slowly poured into 20 liters of acetone to precipitate amine-terminated polyimide oligomer as a solid product. The precipitate was dried in vacuum at 180° C. The number average molecular weight (Mn) of this oligomer was measured by GPC using DMF solvent, which was 4900 in terms of PEG. The glass transition temperature determined by DSC was 239° C. NMR spectrum revealed that the rate of conversion into imide was about 95% and the rate of amine terminals was about 95%.

<Part B: Preparation of Resin of Element [B] and Measurements of Physical Properties Thereof>

In a beaker, 27 parts of the polyimide oligomer obtained in the above-described Part A, 50 parts of triglycidylaminophenol (EPIKOTE YX-4, commercially available from YUKA SHELL EPOXY CO., LTD.) and 50 parts of bisphenol F type epoxy resin (EPICLON 830, commercially available from DAINIPPON INK & CHEMICALS, INC.) were placed. The mixture was heated at 120° C. for 2 hours to dissolve the oligomer in the epoxy resins. Then 48 parts of 4,4'-diaminodiphenylsulfone (SUMICURE S, commercially available from SUMITOMO CHEMICAL CO., LTD.) was added and the mixture was stirred at 140° C. for 10 minutes to dissolve the same.

A vacuum pump was connected to the vessel and the mixture was defoamed in vacuum. The mixture was poured into a releasing-treated mold with an inner size of 120 mm×120 mm×3 mm, which was preliminarily heated at 120° C. The mixture was then cured in an oven at 130° C. for 2 hours and then at 180° C. for another 2 hours to obtain a cured resin plate with a thickness of 3 mm.

The Tg of the thus obtained cured resin was 204° C. The above-mentioned sample was cut out from this plate and strain energy release rate $G_{IC}$ and bending elastic modulus were measured, which were 640 J/m$^2$ and 360 kg/mm$^2$, respectively. A resin plate sizing 60 mm×10 mm×2 mm was boiled for 20 hours. The water absorption was 3.2%.

A polished surface of the cured resin was stained with osmic acid and its reflected electron image was observed with a scanning electron microscope. A micro-phase separation structure in which an oligomer-rich phase constitutes a continuous phase and an epoxy resins-rich phase constitutes a dispersed phase was observed. The same visual field was subjected to elementary analysis with an X-ray microanalyzer. As a result, fluorine element was densely distributed in the high contrast phase which is black in a photograph.

<Part C: Preparation of Prepreg and Composite and Measurements of Physical Properties Thereof>

Firstly, a resin was prepared using a kneader as follows. In a vessel, 27 parts of the polyimide oligomer obtained in the above-described Part A, 50 parts of triglycidylaminophenol (EPIKOTE YX-4, commercially available from YUKA SHELL EPOXY CO., LTD.) and 50 parts of bisphenol F type epoxy resin (EPICLON 830, commercially available from DAINIPPON INK & CHEMICALS, INC.) were placed. The mixture was heated at 120° C. for 2 hours to dissolve the oligomer in the epoxy resins. The mixture was then cooled to 70° C. and 48 parts of 4,4′-diaminodiphenylsulfone (SUMICURE S, commercially available from SUMITOMO CHEMICAL CO., LTD.) was added and the mixture was stirred.

The thus obtained resin composition was coated at a constant thickness on a releasing paper to which a silicone releasing agent had been thinly applied, to obtain resin films having a weight of 32 g/m². Carbon fibers (TORAYCA T800H, commercially available from TORAY INDUSTRIES, INC.) were aligned in one direction and then sandwiched between two sheets of resin-coated paper prepared as mentioned above. The sheets of paper were pressed to the fibers to impregnate the fibers with the resin to obtain a primary prepreg. The weight of the carbon fibers was 190 g/m².

Then 68 parts of the resin composition described above was prepared again and was mixed in a kneader at 60° C. with 32 parts of fine particles with an average particle size of 16 μm having semi-IPN structure consisting of amorphous transparent nylon (GRILAMID TR-55, commercially available from MITSUBISHI KASEI CORPORATION), bisphenol A type epoxy resin (EPIKOTE 828, commercially available from YUKA SHELL EPOXY CO., LTD.) and polyamide type curing agent (TOHMIDE #296, commercially available from FUJI CHEMICAL CO., LTD.) at a weight ratio of 96/3/1. This mixture was coated on a releasing paper to obtain resin films with a weight of 20 g/m².

On both surfaces of the above-described primary prepreg, the thus obtained resin films containing the fine particles were laid-up and the laminate was pressed with a roll to obtain a prepreg. This prepreg had good tackiness and drapability.

Twenty four prepregs thus obtained were laid-up in a quasi-isotropic fashion (+45°/0°/−45°/90°)3s. According to a conventional vacuum bag autoclave molding method, the laminate was heated to 180° C. at a heating rate of 1.5° C./min. under a pressure of 6 kg/cm² and then heated at this temperature for 2 hours to obtain a cured plate. The percentage of the fibers was 55.8 vol % and the percentage of the resin was 35.2 wt %. A cross-section of this cured plate was observed with a microscope. As a result, it was confirmed that the GRILAMID fine particles localized in the interlayer zones of the laminate. From a photomicrograph of the cross-section at 200× magnification, the average thickness of the interlayer zone was calculated, which was 20.3 μm. The CV value showing the distribution of the thickness of the interlayer zone was 38.5%.

A test sample sizing 4 inches×6 inches was cut out from the cured plate. In the same manner as in Example 1, drop impact energy of 1500 in.lb/in was given to the sample. The damaged area measured with an ultrasonic damage-imaging apparatus M400B commercially available from CANON/HORONIX CO., LTD. was 0.33 inch². The residual compressive strength was determined according to ASTM D-695, which was 58 ksi. A polished surface of the cured resin was stained with osmic acid and its reflected electron image was observed with a scanning electron microscope. As a result, a micro-phase separation structure was observed in the resin portion.

Six prepregs were laid-up in the same direction and cured. The tensile strength of this cured plate in the direction of 0° was 440 ksi. Further, 10 prepregs were laid-up in the structure of (±25/±25/90)s and the laminate was cured. The obtained cured plate was subjected to tensile test and the strength at which the edge of the plate is first peeled off was measured, which was 68.7 ksi.

EXAMPLE 3

<Part A: Synthesis of Reactive Polyimide Oligomer>

Siloxane polyimide oligomer was prepared in the same manner as in Example 1 except that 392 g (0.91 mol) of bis[4-(3-aminophenoxy)phenyl]sulfone (BAPS-M), 39 g (0.11 mol) of FDA, 147 g (0.11 mol) of amino-terminated dimethyl siloxane with an $NH_2$ equivalent of 650 (BY-16-853 commercially available from TORAY DOW CORNING SILICONE, CO., LTD.) and 300 g (1.02 mol) of biphenyltetracarboxylic dianhydride were used as the monomer material.

The number average molecular weight ($M_n$) of this oligomer was 5500 in terms of PEG, and the glass transition temperature measured by DSC was 223° C. The introduction of siloxane skeleton and the amine-terminated structure were confirmed by NMR spectrum and IR spectrum.

<Part B: Preparation of Resin of Element [B] and Measurements of Physical Properties Thereof>

To 31 parts of O,O′-diallylbisphenol A, 30 parts of the siloxane polyimide oligomer prepared in Part A described above was added and the resulting mixture was heated at 140° C. for 2 hours. With this mixture, 39 parts of diphenylmethane bismaleimide was uniformly mixed and dissolved therein. A vacuum pump was connected to the vessel holding the mixture and the mixture was defoamed in vacuum. The mixture was poured into a releasing-treated mold, which was preliminarily heated at 120° C. The mixture was then cured in an oven at 180° C. for 2 hours to obtain a cured resin plate with a thickness of 3 mm. The thus obtained cured plate was subjected to post-cure at 200° C. for 2 hours and at 250° C. for 6 hours.

The Tg of the thus obtained cured resin was 295° C. The strain energy release rate $G_{IC}$ was 800 J/m² and the bending elastic modulus was 380 kg/mm². A resin plate sizing 60 mm×10 mm×2 mm was boiled for 20 hours. The water absorption was 2.0%.

A polished surface of the cured resin was stained with osmic acid and its reflected electron image was observed with a scanning electron microscope. A micro-phase separation structure in which an oligomer-rich phase constitutes a continuous phase was observed.

<Part C: Preparation of Prepreg and Composite and Measurements of Physical Properties Thereof>

Firstly, 30 parts of the polyimide oligomer prepared in Part A described above, 31 parts of O,O′-diallylbisphenol A, and 39 parts of diphenylmethane bismaleimide were uniformly mixed in a kneader.

The thus obtained resin composition was coated at a constant thickness on a releasing paper to which a silicone releasing agent had been thinly applied, to obtain resin films having a weight of 32 g/m². Carbon fibers (TORAYCA T800H, commercially available from TORAY INDUSTRIES, INC.) were aligned in one direction and then sandwiched between two sheets of resin-coated paper prepared as mentioned above. The sheets of paper were pressed to the fibers to impregnate the fibers with the resin to obtain a primary prepreg. The weight of the carbon fibers was 190 g/m$^2$.

Then 68 parts of the resin composition described above was prepared again and was mixed in a kneader at 60° C. with 32 parts of fine particles of polyamideimide (TORLON, commercially available from MITSUBISHI KASEI CORPORATION) with an average particle size of 27 μm. This mixture was coated on a releasing paper to obtain resin films with a weight of 20 g/m$^2$.

On both surfaces of the above-described primary prepreg, the thus obtained resin films containing the fine particles were laid-up and the laminate was pressed with a roll to obtain a prepreg. This prepreg had good tackiness and drapability.

Twenty four prepregs thus obtained were laid-up in a quasi-isotropic fashion $(+45°/0°/-45°/90°)_{3s}$. According to a conventional vacuum bag autoclave molding method, the laminate was heated to 180° C. at a heating rate of 1.5° C./min. under a pressure of 6 kg/cm$^2$ and then heated at this temperature for 2 hours and then at 230° C. for 16 hours to obtain a cured plate. The percentage of the fibers was 55.4 vol % and the percentage of the resin was 35.8 wt %. A cross-section of this cured plate was observed with a microscope. As a result, it was confirmed that the polyamideimide fine particles localized in the interlayer zones of the laminate. From a photomicrograph of the cross-section at 200× magnification, the average thickness of the interlayer zone was calculated, which was 24.4 μm. The CV value showing the distribution of the thickness of the interlayer zone was 47.1%.

A test sample sizing 4 inches×6 inches was cut out from the cured plate. In the same manner as in Example 1, drop impact energy of 1500 in.lb/in was given to the sample. The damaged area measured with an ultrasonic damage-imaging apparatus M400B commercially available from CANON/HORONIX CO., LTD. was 0.83 inch$^2$. The residual compressive strength was determined according to ASTM D-695, which was 53 ksi. A polished surface of the cured resin was stained with osmic acid and its reflected electron image was observed with a scanning electron microscope. As a result, a micro-phase separation structure was observed in the resin portion.

Six prepregs were laid-up in the same direction and cured. The tensile strength of this cured plate in the direction of 0° was 453 ksi. Further, 10 prepregs were laid-up in the structure of $(\pm25/\pm25/90)s$ and the laminate was cured. The obtained cured plate was subjected to tensile test and the strength at which the edge of the plate is first peeled off was measured, which was 58.5 ksi.

EXAMPLE 4

A cured plate was prepared in the same manner as in Example 1 except that the amount of the siloxane polyimide oligomer used for preparing the resin of the element [B] was 48 parts instead of 25 parts.

The Tg of the thus obtained cured resin was 200° C. The strain energy release rate $G_{IC}$ was 970 J/m$^2$ and the bending elastic modulus was 360 kg/mm$^2$, respectively.

A resin plate sizing 60 mm×10 mm×2 mm was boiled for 20 hours. The water absorption was 2.6%.

A resin composition was prepared in the same manner as in Example 1, Part C except that the amount of the siloxane polyimide oligomer used was 48 parts instead of 25 parts. The thus obtained resin composition was coated at a constant thickness on a releasing paper to which a silicone releasing agent had been thinly applied, to obtain resin films having a weight of =1 g/m$^2$. Carbon fibers (TORAYCA T800H, commercially available from TORAY INDUSTRIES, INC.) were aligned in one direction and then sandwiched between two sheets of resin-coated paper prepared as mentioned above. The sheets of paper were pressed to the fibers to impregnate the fibers with the resin to obtain a primary prepreg. The weight of the carbon fibers was 190 g/m$^2$.

Then 68 parts of the resin composition described above was prepared again and was mixed in a kneader at 60° C. with 15 parts of fine particles of phenol resin (BELLPEARL R-800, commercially available from KANEBO LTD., Osaka, Japan) with particle sizes of 1–30 μm. This mixture was coated on a releasing paper to obtain resin films with a weight of 20 g/m$^2$.

On both surfaces of the above-described primary prepreg, the thus obtained resin films containing the fine particles were laid-up and the laminate was pressed with a roll to obtain a prepreg. This prepreg had good tackiness and drapability.

Twenty four prepregs thus obtained were laid-up in a quasi-isotropic fashion $(+45°/0°/-45°/90°)_{3s}$. According to a conventional vacuum bag autoclave molding method, the laminate was heated to 180° C. at a heating rate of 1.5° C./min. under a pressure of 6 kg/cm$^2$ and then heated at this temperature for 2 hours to obtain a cured plate. The percentage of the fibers was 56 vol % and the percentage of the resin was 35.1 wt %. A cross-section of this cured plate was observed with a microscope. As a result, it was confirmed that the phenol resin fine particles localized in the interlayer zones of the laminate. From a photomicrograph of the cross-section at 200× magnification, the average thickness of the interlayer zone was calculated, which was 22.0 μm. The CV value showing the distribution of the thickness of the interlayer zone was 32.0%.

A test sample sizing 4 inches×6 inches was cut out from the cured plate. In the same manner as in Example 1, drop impact energy of 1500 in.lb/in was given to the sample. The damaged area measured with an ultrasonic damage-imaging apparatus M400B commercially available from CANON/HORONIX CO., LTD. was 0.80 inch$^2$. The residual compressive strength was determined according to ASTM D-695, which was 50 ksi. A polished surface of the cured resin was stained with osmic acid and its reflected electron image was observed with a scanning electron microscope. As a result, a micro-phase separation structure was observed in the resin portion.

Twenty prepregs were laid-up in one direction and the resulting laminate was cured. The toughness of the interlayer zone in the composite was measured. As a result, the toughness $G_{IC}$ of the peeling mode was 820 J/m$^2$ (double cantilever beam method).

A cured plate having a layered structure of $(0)_2/(90)_8/(0)_2$ was prepared and a sample sizing 9 inches length×1 inch width was cut out. Tabs were attached to the sample and tensile test was carried out. The number of cracks formed in the 90° layers spanning 5.7 inches was 2 when the strain was 1.3%.

A sample sizing 30 mm×40 mm was cut out from a cured plate having the same layered structure as that used in the above-described CAI test and a thermal cycle test was carried out. That is, the sample was placed in an environment at −196° C. (immersed in liquid nitrogen) for 3 minutes and then placed in an environment at 100° C. for 3 minutes, and this cycle was repeated 30 times. No cracks were formed in this thermal cycle test.

Six prepregs were laid-up in the same direction and cured. The tensile strength of this cured plate in the direction of 0° was 449 ksi. Further, 10 prepregs were laid-up in the structure of (±25/±25/90)s and the laminate was cured. The obtained cured plate was subjected to tensile test and the strength at which the edge of the plate is first peeled off was measured, which was 58.3 ksi.

Comparative Example 1

The same procedure as in Example 1 was repeated except that the resin composition of the element [B] did not contain the siloxane polyimide oligomer (i.e., a resin composition containing 40 parts of tetraglycidyl-diaminodiphenyl methane (ELM434, commercially available from SUMITOMO CHEMICAL, CO., LTD., Osaka, Japan), 30 parts of bisphenol A type epoxy resin (EPIKOTE 825, commercially available from YUKA SHELL EPOXY CO., LTD., Japan), 30 parts of bisphenol F type epoxy resin (EPICLON 830, commercially available from DAINIPPON INK & CHEMICALS, INC., Tokyo, Japan) and 42 parts of 4,4′-diaminodiphenylsulfone (SUMICURE S, commercially available from SUMITOMO CHEMICAL CO., LTD., Osaka, Japan), thereby obtaining a cured plate.

In the same manner as in Example 1, drop impact energy of 1500 in.lb/in was given to the sample. The damaged area measured with an ultrasonic damage-imaging apparatus was 0.78 inch². The residual compressive strength was determined according to ASTM D-695, which was 50 ksi. A polished surface of the cured resin was stained with osmic acid and its reflected electron image was observed with a scanning electron microscope. As a result, a micro-phase separation structure was not observed in the cured epoxy resin.

Twenty prepregs were laid-up in one direction and the resulting laminate was cured. The toughness of the interlayer zone in the composite was measured. As a result, the toughness $G_{IC}$ of the peeling mode was 260 J/m² (double cantilever beam method), and the toughness $G_{IIC}$ of the slipping mode was 2170 J/m² (end-notched flexure method).

A cured plate having a layered structure of $(0)_2/(90)_8/(0)_2$ was prepared and a sample sizing 9 inches length×1 inch width was cut out. Tabs were attached to the sample and tensile test was carried out. The number of cracks formed in the 90° layers spanning 5.7 inches was as many as 14 when the strain was 1.3%.

A sample sizing 30 mm×40 mm was cut out from a cured plate having the same layered structure as that used in the above-described CAI test and a thermal cycle test was carried out. That is, the sample was placed in an environment at −196° C. (immersed in liquid nitrogen) for 3 minutes and then placed in an environment at 100° C. for 3 minutes, and this cycle was repeated 30 times. A number of cracks were formed in the surfaces of the cured plate.

Six prepregs were laid-up in the same direction and cured. The tensile strength of this cured plate in the direction of 0° was 405 ksi. Further, 10 prepregs were laid-up in the structure of (±25/±25/90)s and the laminate was cured. The obtained cured plate was subjected to tensile test and the strength at which the edge of the plate is first peeled off was measured, which was 49.9 ksi.

We claim:

1. A prepreg comprising elements A, B and C, wherein element A is reinforcing fibers;
   element B is a resin composition including a thermosetting resin and a thermoplastic resin which is soluble in said thermosetting resin, which resin composition being capable of forming a microphase separation structure; and
   element C comprises fine particles which are insoluble in said element B and which do not contain an elastomer component;
   said element C being localized in a surface of said prepreg.

2. The prepreg of claim 1 wherein not less than 90% of said element C is localized in the region from the surface to the depth at 15% of the thickness of said prepreg.

3. The prepreg of claim 1, wherein said element C is fine particles consisting essentially of a thermoplastic resin.

4. The prepreg of claim 1, wherein said thermoplastic resin is at least one selected from the group consisting of polyamides, polyamideimides and polyetherimides.

5. The prepreg of claim 1, wherein said element C is thermoplastic resin fine particles having semi-IPN structures formed with an epoxy resin or a bismaleimide resin.

6. The prepreg of claim 1, wherein said element C is fine particles consisting essentially of a thermosetting resin.

7. The prepreg of claim 6, wherein said element C is fine particles consisting essentially of a phenol resin.

8. The prepreg of claim 6, wherein said element C is fine particles consisting essentially of an epoxy resin.

9. The prepreg of claim 1, wherein said thermoplastic resin in said element B is a reactive polyimide.

10. The prepreg of claim 9, wherein said thermoplastic resin in said element B is a polyimide having a hexafluoropropane skeleton.

11. The prepreg of claim 1, wherein said thermoplastic resin in said element B is a block copolymer or a graft copolymer having chain segments miscible with said thermosetting resin and chain segments immiscible with said thermosetting resin.

12. The prepreg of claim 9, wherein said reactive polyimide is block copolymer comprising siloxane chain segments.

13. The prepreg of claim 1, wherein said thermosetting resin in said element B is at least one resin selected from the group consisting of epoxy resins and bismaleimide resins.

14. A composite comprising at least two layers, at least one layer of said composite comprising elements A, B′ and C;
   wherein element A is reinforcing fibers;
   wherein element B′ is cured resin having a microphase separation structure, said structure having a first phase containing a thermosetting resin as a major constituent and a second phase containing a thermoplastic resin as a major constituent; and wherein element C is fine particles which are insoluble in said element B' before element B' is cured and which do not contain an elastomer component; said element C being localized in interlayer zones between said layers of said composite.

15. The composite of claim 14 wherein the average thickness of said interlayer zone is 10–70 μm and the distribution in the thickness of said interlayer zone is not more than 50 in terms of CV value.

16. The composite of claim 14, wherein not less than 90% of said element C is localized in said interlayer zone.

17. The composite of claim 14, wherein said element C is fine particles consisting essentially of a thermoplastic resin.

18. The composite of claim 14, wherein said thermoplastic resin is at least one resin selected from the group consisting of polyamides, polyamideimides and polyetherimides.

19. The composite of claim 14, wherein said element C is thermoplastic resin fine particles having semi-IPN structures formed with an epoxy resin or a bismaleimide resin.

20. The composite of claim 14, wherein said element C is fine particles consisting essentially of a thermosetting resin.

21. The composite of claim 20, wherein said element C is fine particles consisting essentially of a phenol resin.

22. The composite of claim 20, wherein said element C is fine particles consisting essentially of an epoxy resin.

23. The composite of claim 14, wherein said thermoplastic resin in said element B' is a polyimide.

24. The composite of claim 23, wherein said thermoplastic resin in said element B' is a polyimide having hexafluoropropane skeleton.

25. The composite of claim 23, wherein said polyimide is a block copolymer having block-copolymerized siloxane chain segments.

26. The composite of claim 14, wherein said thermosetting resin in said element B' is an epoxy resin or bismaleimide resin.

* * * * *